Dec. 12, 1933.   A. W. WOODWARD   1,938,614
MANUFACTURE OF VEHICLE RIMS
Original Filed May 15, 1928    2 Sheets-Sheet 1
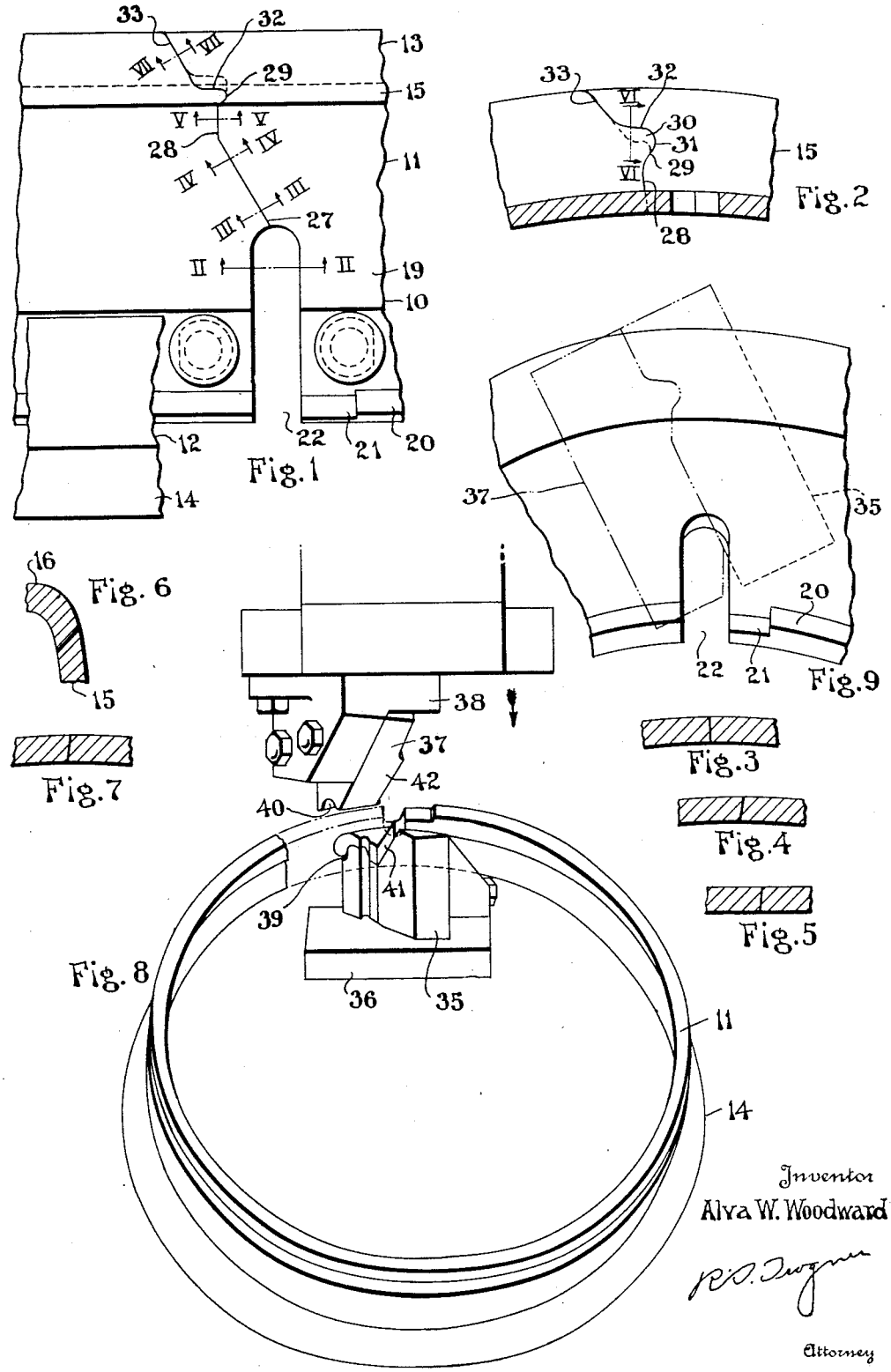

Dec. 12, 1933.   A. W. WOODWARD   1,938,614
MANUFACTURE OF VEHICLE RIMS
Original Filed May 15, 1928   2 Sheets-Sheet 2
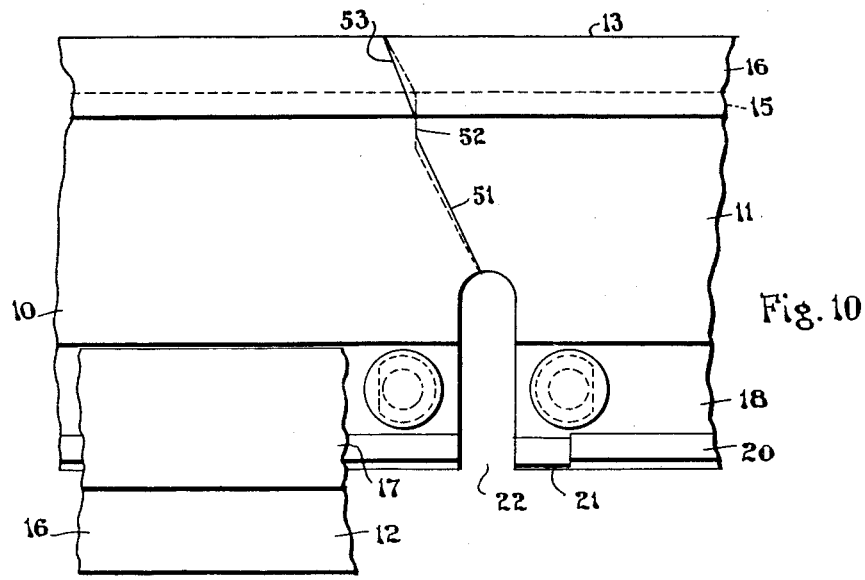
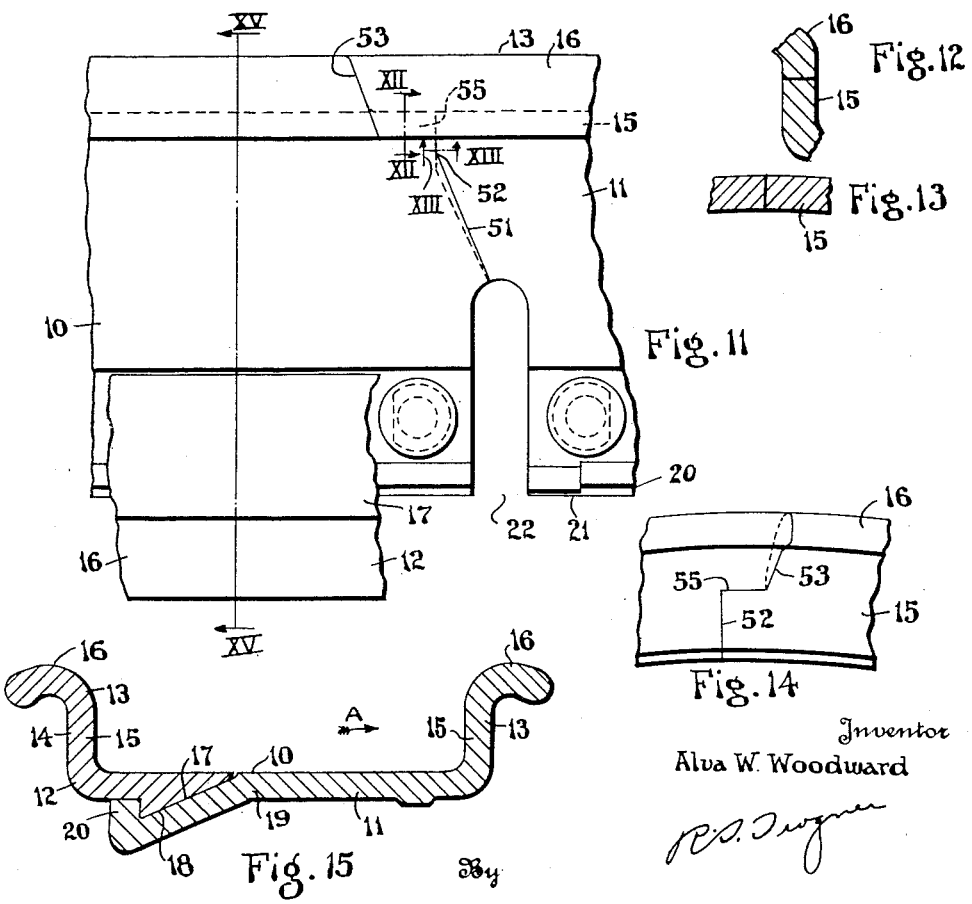
Inventor
Alva W. Woodward
Attorney Patented Dec. 12, 1933

1,938,614

UNITED STATES PATENT OFFICE 1,938,614

MANUFACTURE OF VEHICLE RIMS

Alva W. Woodward, Akron, Ohio, assignor, by mesne assignments, to Wingfoot Corporation, Wilmington, Del., a corporation of Delaware Original application May 15, 1928, Serial No. 277,876. Divided and this application January 30, 1929. Serial No. 336,177

1 Claim. (Cl. 29—159.1)

My invention relates to vehicle wheel rims and it has particular relation to rims of the aforesaid character embodying transversely split annular members which are associated operatively with endless side rings.

The object of the invention is to provide a novel and inexpensive method of forming a transverse split in an annular member.

This application is a division of application Serial No. 277,876, filed May 15, 1928.

Prior to this invention certain types of rims employed in relatively large numbers upon the wheels of motor vehicles were composed of transversely split annular members having endless side rings disposed in interlocking relation thereto. In each rim the endless ring prevented outward radial movement of the ends of the transversely split member and largely prevented relative lateral movement of such ends. Frequently, however, the endless ring did not securely engage the ends of the split member and considerable relative lateral movement of such ends occurred.

The split in the member extended diagonally across the base and through a portion of the sidewall of the tire-engaging flange along a non-radial plane, thus providing a so-called undercut portion; thence circumferentially along the sidewall of the flange; and finally diagonally across the curved section of the flange in parallel relation to the aforesaid undercut portion. Since the abutting undercut end portions of the member extended diagonally across the latter without interruption, except for abutting edges of the circumferential portion of the split, lateral movement in one direction of one end of the member with respect to the other was opposed only by the endless retaining rings. On the other hand, inward radial movement of one of the ends of the member was prevented solely by the abutting edges of the circumferenial portion of the split. Consequently, if one of the ends of the member moved laterally with respect to the other, a distance corresponding to the thickness of the flange, the other end of the member became free to move inwardly. Since the pressure in a tire upon the rim tended to contract the member, this radial movement was accentuated and often resulted in the complete dislocation of the ends of the member.

Heretofore, the split in the member was formed by initially sawing through the base of the member and a portion of the sidewall of the tire engaging flange thereof, then sawing from the opposite side of the member through the curved portion of the tire engaging flange, and finally shearing circumferentially along the sidewall of the flange between the adjacent ends of the first mentioned portions of the split. This process of forming the split required considerable time and labor, and therefore, increased materially the expense of manufacturing the rim.

This invention practically obviates the difficulties heretofore encountered by providing a transversely split member having a portion of the split located in the base and sidewall thereof, which is disposed in a plane substantially intersecting the axis of the rim. Hence, the ends of the member have frictionally engaging portions which strongly oppose relative lateral movement of such ends. The split preferably is formed by a single shearing operation, in which it is necessary to form the circumferential portion of the split at an angle to the sidewall of the flange. Consequently, the end portions of the rim bordering the circumferential part of the split do not positively oppose inward radial movement of one end of the rim with respect to the other. To offset this, the vertically disposed portion of the split in the sidewall is arcuated to provide a projection on one end of the rim which extends into a depression in the other end.

For a better understanding of the invention, reference may now be had to the accompanying drawings, forming a part of the specification, of which:

Fig. 1 is a fragmentary plan view of a rim constructed according to a preferred form of the invention;

Fig. 2 is a cross-sectional view, taken substantially along the line II—II of Fig. 1;

Fig. 3 is a cross-sectional view, taken substantially along the line III—III of Fig. 1;

Fig. 4 is a cross-sectional view, taken substantially along the line IV—IV of Fig. 2;

Fig. 5 is a view taken substantially along the line V—V of Fig. 1;

Fig. 6 is a view taken substantially along the line VI—VI of Fig. 2;

Fig. 7 is a view taken substantially along the line VII—VII of Fig. 1;

Fig. 8 is a perspective view, having portions thereof broken away, of the cutting mechanism employed in forming the split;

Fig. 9 is a fragmentary plan view of the rim, as shown by Fig. 8, with the shearing members shown in broken lines;

Fig. 10 is a fragmentary plan view of a rim embodying another form of the invention;

Fig. 11 is a fragmentary plan view of a rim embodying still another form of the invention;

Fig. 12 is a cross-sectional view, taken substantially along the line XII—XII of Fig. 11;

Fig. 13 is a cross-sectional view, taken substantially along the line XIII—XIII of Fig. 11;

Fig. 14 is a fragmentary elevational view of the split in the flange, taken externally of the rim shown in Fig. 11; and Fig. 15 is a cross-sectional view, taken substantially along the line XV—XV of Fig. 11.

A rim 10 employed in practicing the invention comprises a transversely split member 11 and an endless side ring 12, having tire engaging flanges 13 and 14, respectively. As best shown by Fig. 15, the flanges are provided with normally projecting sidewalls 15, which merge at their outer edge into arcuate portions 16. The members 11 and 12, in their operative positions, are interlocked by an inclined shoulder 17 formed on the inner periphery of the member 12, which abuts a flange 20 disposed around the outer edge of an inclined portion 18 projecting inwardly from an edge of a base 19 of the member 11. Separation of the members 11 and 12 is facilitated by a notch 21, formed in the flange 20, adjacent an opening 22 which is provided for a valve stem of an inner tube of a pneumatic tire casing (not shown). This notch provides an initial purchase for a suitable tool employed in forcing one end of the member 11 inwardly and laterally away from the ring 12, after which the aforesaid tool may be employed effectively at other points about the rim, until the members are completely separated.

Referring more particularly to Fig. 1, the split in the member 11 comprises a diagonally directed portion 27 formed in the base 19, which communicates at one end with the valve stem opening 22 and extends oppositely therefrom toward the tire engaging flange 13. As shown by Figs. 3 and 4, this portion 27 of the split is slightly undercut at an angle which progressively increases as the split approaches the tire engaging flange 13. This variation of the angle of undercut results from cutting in a diagonal direction through a circumferentially curved section of the member.

Adjacent the flange 13 the split extends, as indicated at 28, into the sidewall 15 thereof in a substantially radial plane, parallel to the axis of the rim. The lower edge of the flange 13 is provided with an arcuate portion 29, embodying a continuation of the split 27 beyond the portion 28, which projects toward the plane of the valve stem opening 22 in overhanging relation to the portion 28. Thus, it will be observed that a radial plane substantially coinciding with the portion 28 of the split will intersect the arcuate portion 29 at two points. Consequently, one end of the member 11 has a hook or projection 30, and the other end, a corresponding depression 31.

The arcuate portion 29 of the split communicates at its outer end with one end of a circumferentially extending portion 32 (Fig. 2) disposed in the sidewall 16, which is inclined laterally with respect to the sidewall. The other end of the portion 32 communicates with a portion 33 of the split, which extends diagonally through the curved section 16 of the flange.

As shown by Fig. 8, a mechanism employed in forming the split by a single shearing operation comprises a stationary shearing member 35, supported upon a base 36, and a complementary shearing member 37, which is mounted in a movable support 38. The shearing members 35 and 37 are provided with complementary surfaces 39 and 40, respectively, which conform to the inner and outer peripheral surfaces of the member 11 when the latter is disposed at a predetermined angle with respect to the path of movement of the shearing member 37 and the shearing members are disposed at predetermined angles with respect to a radial plane passing centrally through the opening 22. Complementary edges 41 and 42 of the shearing members 35 and 37 respectively, correspond to the configuration of the split in the member 11, and are adapted to form a split communicating with the valve stem opening 22 in the rim.

In operation, the member 11 is disposed upon the stationary member 35 in the relation hereinbefore described (Figs. 8 and 9), and the shearing member 37 is actuated downwardly upon the latter in shearing relation to the edge 39 of the lower shearing member.

Preferably, the path of movement of the shearing member 37 is substantially parallel to a plane including the axis of the rim and a radius thereof extending to the valve stem opening. Several factors control the inclination of the ends of the rim at the split with respect to radii of the rim extending thereto. For example, the rim section is arcuate and the split extends in a general diagonal direction. Because of these facts, the inclination of the ends of the rim along such a diagonal line will vary in a uniform manner. Moreover, the rim is disposed in a plane inclined with respect to the path of movement of the shearing member 42 which necessarily affects the inclination of the ends of the rim. It is apparent that the inclination of the ends of the rim with respect to radii extending thereto may be varied by varying the path of movement of the shearing member 37 with respect to the plane defined by the axis of the rim and the radius thereof extending to the valve stem opening.

When the transversely split member 11 is assembled with the endless ring 12, several factors enter into the maintenance of the ends of the member 11 in operative position. Primarily, the relative lateral movement of the ends of the member 11 is opposed by the interlocking ring disposed thereupon. However, if the ring does not prevent all relative lateral movement of the ends of the member, such other movement as might occur, is opposed positively by the frictional engagement of the ends of the member adjacent the portion 28 of the split. This frictional engagement is, of course, accentuated by the pressure of an inflated inner tube on the rim, which tends to contract the member 11 and thus strongly urges the ends against each other. In addition, the ends of the member have portions abutting along diagonal lines, which prevents relative lateral movement of the ends in one direction.

Outward radial movement of the ends of the member, relatively, is prevented initially by the ring 12, but such movement is positively prevented by the projection 30 in one end of the member 11 engaging the depression 31 in the other end. Moreover, since the portions 28 and 32 are slightly undercut, the ends of the member 11 adjacent these portions of the split serve to prevent their relative radial movement in one direction.

In the embodiment of the invention illustrated by Fig. 10, the split in the member 11 comprises a diagonal portion 51, extending across the base 19 of the rim and identical with the portion 27 shown by Fig. 1; a portion 52 extending normally through a portion of the base and through a portion of the sidewall 14 (see Fig. 14), and a portion 53 extending diagonally through the curved portion 16 of the tire engaging flange. Preferably, this split is formed by shearing substantially radially through the base to form the portion 51 and the part of the portion 52 in the base of the member, and thereafter shearing substantially in a direction parallel to the axis of the rim, as indicated by the arrow A in Fig. 15, thus forming the remainder of the portion 52 and the portion 53. Hence, in this construction, two operations are required to form the split.

The construction shown by Fig. 11 is identical with that shown by Fig. 10, with the exception that between the portions 52 and 53 of the split shown in the latter figure, a circumferentially extending portion 55 (Fig. 14) is provided. The object of the portion 55 of the split is to assist in preventing relative radial movement of the ends of the member. Formation of the split in this construction is effected by the same method as that employed in forming the split illustrated by Fig. 10.

From the foregoing description, it is apparent that a rim has been provided in which the transversely split member is positively maintained in its operative position. Consequently, when the rim is in operation, there is little chance of the parts becoming disassembled. Moreover, by forming the split in the manner described, the expense of manufacturing the rim is reduced to a minimum.

Although I have illustrated only the preferred forms which the invention may assume and have described those forms in detail, it will be apparent to those skilled in the art that the invention is not so limited but that various minor modifications may be made therein without departing from the spirit of the invention or from the scope of the appended claim.

What I claim is:

The method of making a transversely split rim member which comprises forming an endless rim member having at opposite edges substantially radial, outwardly projecting flanges, forming a valve stem opening extending laterally from a point substantially centrally of the base member through one of the flanges, supporting the base member and the other side flange upon a shearing member having a shearing edge disposed diagonally of the base and intersecting the valve stem opening therein, and shearing the rim with a complementary shearing member movable in a direction at an angle to the axis of the rim member but substantially parallel to a plane defined by the axis of the base member and a radius extending from the valve stem opening to the axis.

ALVA W. WOODWARD.